US005712512A

United States Patent [19]

Ostermann et al.

[11] Patent Number: 5,712,512
[45] Date of Patent: Jan. 27, 1998

[54] METHOD OF RESETTING A CENTRAL LOCK SYSTEM OF A MOTOR VEHICLE HAVING A REMOTE OPERATOR

[75] Inventors: Wilfried Ostermann, Essen; Fred Welskopf, Herne, both of Germany

[73] Assignee: Kiekert AG, Heiligenhaus, Germany

[21] Appl. No.: 690,970

[22] Filed: Aug. 1, 1996

[30] Foreign Application Priority Data

Sep. 8, 1995 [DE] Germany ........................ 195 33 191.5

[51] Int. Cl.[6] ........................................ G06F 17/00

[52] U.S. Cl. ........................ 307/10.2; 307/10.4; 307/10.5; 364/424.037; 364/424.04; 180/287; 340/825.69

[58] Field of Search ........................ 307/9.1–10.8; 361/171; 340/425.5, 426, 534, 825.31, 825.34, 825.69, 825.72; 180/287; 123/198 B, 198 DB, 198 DC; 364/423.098, 423.099, 424.034, 424.037, 424.038, 424.04, 424.045, 424.059

[56] References Cited

U.S. PATENT DOCUMENTS 4,942,393 7/1990 Waraksa et al. .................... 340/825.72
5,049,867 9/1991 Stouffer .................................. 307/10.2
5,513,107 4/1996 Gormley ................................ 307/10.2
5,523,948 6/1996 Adrain ................................ 364/431.01
5,561,420 10/1996 Kleefeldt et al. .................. 340/825.31
5,583,383 12/1996 Denz .................................. 307/10.2

FOREIGN PATENT DOCUMENTS 42 27 887 1/1994 Germany .
42 38 858 2/1994 Germany .
44 28 947 4/1996 Germany .

*Primary Examiner*—William M. Shoop, Jr.
*Assistant Examiner*—Peter Ganjian
*Attorney, Agent, or Firm*—Herbert Dubno

[57] ABSTRACT

A method of resetting a central lock system of a motor vehicle automobile connects a diagnostic device to a fixed part of the system. When the central unit is switched to the "SETUP" mode, the key of a new portable unit is inserted into a key-operated switch to interrogate a transponder of the portable unit, a transponder querying transceiver of the fixed unit to derive a key-identification code word which is stored in the transponder and in a memory of the transceiver. The transmitter is then operated to send a remote-control changing code word which progressively changes in the transmitter, to the receiver. The latter picks up the then-effective remote-control changing code word and stores it in the transceiver and transponder code word storage memories as a new transponder changing code word. The fixed unit is then switched back to its "NORMAL" mode.

8 Claims, 1 Drawing Sheet

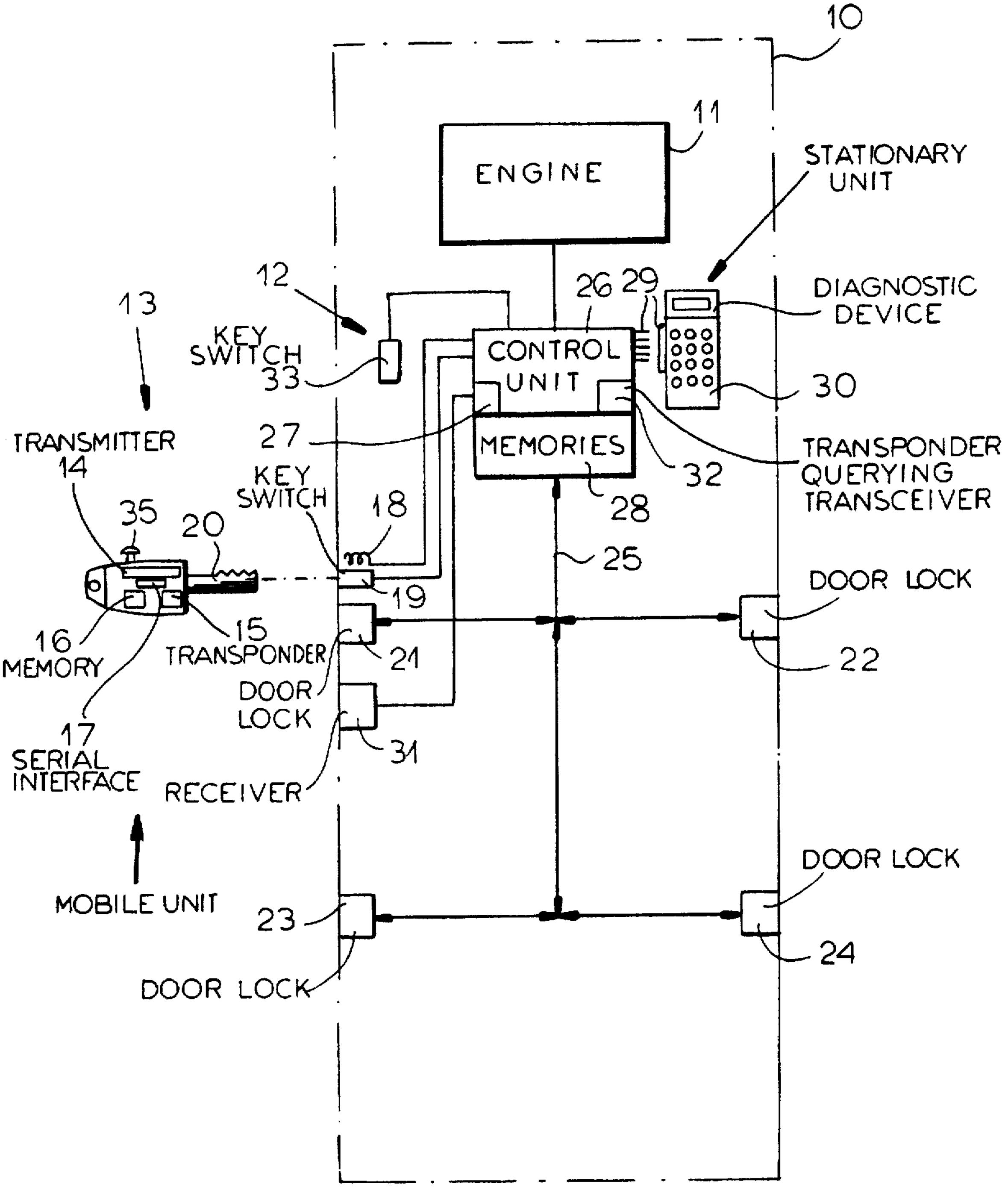
10
11
ENGINE
STATIONARY UNIT
12
13
KEY SWITCH
33
26
29
CONTROL UNIT
DIAGNOSTIC DEVICE
30
TRANSMITTER
14
27
MEMORIES
32
TRANSPONDER QUERYING TRANSCEIVER
28
KEY SWITCH
18
35
20
25
19
DOOR LOCK
16
MEMORY
15
TRANSPONDER
21
22
DOOR LOCK
17
SERIAL INTERFACE
31
RECEIVER
MOBILE UNIT
DOOR LOCK
23
24
DOOR LOCK

METHOD OF RESETTING A CENTRAL LOCK SYSTEM OF A MOTOR VEHICLE HAVING A REMOTE OPERATOR

SPECIFICATION

FIELD OF THE INVENTION

Our present invention relates to a method of resetting a central lock system of a motor vehicle having a remote actuator.

BACKGROUND OF THE INVENTION

It is increasingly common to provide a motor vehicle with a central lock system having a remote actuator for the locking and unlocking of the unit through a central control system, the remote actuator or operator being a mobile part with a transmitter, a transponder and usually a key. The central lock system can respond to a plurality of such mobile units and includes a stationary unit in the vehicle and which can include a receiver, a transponder-querying transceiver and a key-operated switch which is complementary to the key on the mobile part.

The mobile part usually forms a compact structural unit which can be carried by and used by the vehicle operator in a manner similar to that of a classical key. The elements of the stationary part of the system can be arranged at various locations on the vehicle. The key switch can be provided with or without mechanical elements which can be used for locking or unlocking, in addition to providing an electrical input to the control unit. The transmitter and receiver can operate with any wireless mode of communication, for example, via sound waves, especially ultrasound, or via electromagnetic waves, for example, high-frequency radio waves or light waves like, for example, infrared waves. The receiver, of course, is constructed to respond to the type of signal transmitted by the transmitter and is correspondingly arranged in the vehicle.

The transponder querying transreceiver is usually disposed directly at the switch. Of course, a plurality of key switches, each with a respective transponder-querying transreceiver can be provided. At least one of the key switches can then be provided on the exterior or accessible from the exterior of the vehicle while a further key switch can be accessible from the vehicle interior. This latter key switch can serve, in addition to some locking features, also for starting the vehicle, i.e. starting the engine in a manner similar to that of the classical ignition switch.

A central locking system of this type is described in German Patent DE 44 28 947 C1. This central locking system normally functions with the transmitter and receiver synchronized and stepped, possibly cyclically, with changing code words which allow the transmitter and the receiver to communicate with one another independently from an operation of the transmitter.

Reference may be made in this regard to German Patent DE 42 27 887 C1 and DE 42 38 858 C1. The remote changing code word can include a fixed code which is formed by a key identification code word. Each mobile part then has its own key identification code word which is different from the key identification code words of other mobile parts. The key identification code word is permanently stored in the mobile part upon manufacture thereof.

When the transmitter is actuated, the remote changing code word formed at that point in the transmitter is communicated to the receiver and is compared with the changing code word formed at the same time therein. When the two code words are identical or deviate within a permissible divergence window, unlocking or locking of the central lock system is effected in accordance with the actuation of the remote controller.

For operation of the vehicle, the key is inserted into the key switch on the interior of the vehicle, triggering the respective transponder-querying transceiver to send a query to the transponder of the mobile unit and a button therefrom has a response to a transponder changing code word stored in the transponder code memory. Upon coincidence of the transponder and transceiver code words, the then-effective remote control changing code word is read from the receiver into the transponder querying transceiver and transmitted to the transponder.

Thus this remote operating changing code word is formed as the new transponder changing code word and stored in both the transceiver code word memory and in the transponder code word memory.

It is self understood that when an identify is established between the transponder changing code word and the transceiver changing code word upon operation of the key, the vehicle can be set in operation, i.e. the ignition circuit can be operated.

The key switch accessible from the exterior of the vehicle can also be used for locking and unlocking the vehicle in the case of a failure of the transmitter, for example, a low battery. The transponder itself need not have its own energy source. This system has been found to be highly effective. However, for security against theft, there was nevertheless the danger that the vehicle operator might lose the mobile part or one of a plurality of mobile units and the finder might then have unauthorized access to the vehicle and might be in a position to steal the latter.

OBJECTS OF THE INVENTION

It is the principal object of the present invention to provide an improved method of operating a central lock system of the type described whereby security against theft is improved.

Still another object of the invention is to provide an improved method of resetting a central lock system of a motor vehicle having a remote control arrangement for locking and unlocking the central lock system, whereby drawbacks of earlier systems are avoided.

SUMMARY OF THE INVENTION

These objects and others which will become apparent hereinafter are attained, in accordance with the invention, in a method of resetting a central lock system of a motor vehicle of the type described whereby initially a diagnostic device is connected to the stationary part and the stationary part is initialized by the diagnostic device and switched thereby into a "SETUP" operating mode. The key can then be inserted into the key switch or one of the key switches and actuated. By actuation of the key switch, a key identification code word fixedly stored in the transponder is interrogated from the transponder by the transponder-querying transceiver and is stored in a key-identification code word memory of the transponder-querying transceiver. The transmitter is then actuated and transmits a progressively resettable remote actuation changing code word to the receiver and the latter is then picked up by the receiver and stored as an actual remote actuation code word simultaneously in the transceiver code word memory of the transponder-querying transceiver and in the transponder code word memory of the transponder as the new transponder changing code word. Then the central lock system is switched over into a "normal operation" mode and the diagnostic device is removed. This resetting of the system can be done whenever a mobile unit is lost or whenever an additional mobile unit must be set to match the central lock system.

Since the diagnostic device is a device which is available exclusively at an authorized service station and must be connected to the stationary part for the resetting operation, i.e. the SETUP mode, programming of the central unit to allow the new mobile unit to be effective or to prevent a lost mobile unit from being effective can only occur when the diagnostic device is present.

Stated otherwise, the stationary part cannot be switched into the "SETUP" mode in the absence of the diagnostic device. In an initialization of the stationary unit, the code word memory of the stationary unit is extinguished to wipe out the previous remote actuation-changing code word as well as the transponder-changing code word. After resetting, the central lock system can be switched back to normal operation.

The resetting or new setting of the central lock system synchronizes the new mobile unit to the stationary unit at least with respect to the remote actuation changing code word and renders any lost mobile unit ineffective.

As a result, the system is more resistant to theft because any lost mobile part is rendered inoperative for the particular vehicle by the resetting operation since its key identification code word no longer will be recognized by the stationary unit. An unauthorized person cannot gain access to the vehicle since resetting of the lost mobile unit to match the stationary unit can only be accomplished during a new resetting operation with the diagnostic device in place.

The process of the invention can also be used when the transmitter has a button or switch for a multifunctional operation as described in German Patent Application 195 30 724.0 corresponding to copending application Ser. No. 08/668,944 filed 24 Jun. 1996.

The method of the invention is thus a method of resetting a central lock system of a motor vehicle having a remote-control arrangement of locking and unlocking the central lock system and wherein the remote-control arrangement comprises a mobile part separate from the motor vehicle and a fixed part on the motor vehicle, the mobile part comprising a transmitter, a transponder and a key, the fixed part comprising a receiver, a transponder-querying transceiver and a key-operated switch operable by the key.

This method can comprise the steps of:

(a) temporarily connecting a diagnostic device to the fixed part for initializing same and switching the fixed part into a SETUP mode;

(b) with the fixed part of the SETUP mode, inserting the key into the key-operated switch thereby interrogating the transponder with the transceiver, deriving a key-identification code word stored in the transponder and storing the key-identification code word in a memory of the transceiver;

(c) then operating the transmitter to send a remote-control changing code word advancing in the transmitter to the receiver and picking up the then-effective remote control changing code word with the receiver and storing the picked-up then-effective remote-control changing code word in a transceiver code word memory of the transceiver and a transponder code word storage of the transponder as a new transponder changing code word; and (d) then switching the fixed part to a NORMAL mode of operation and removing the diagnostic device.

In a preferred embodiment of the invention wherein the central lock system has a plurality of mobile units with respective different key-identification code words, the central lock system is equipped to receive each mobile unit in succession and the process is repeated while the diagnostic unit remains connected for each of the mobile units separately. Only then is the diagnostic unit disconnected from the stationary. Of course in that case the stationary unit can have for each mobile unit a respective memory for the respective-key identification code word, the respective remote-active changing code word and the associated transponder changing code word. Preferably the stationary unit is programmed to operate with a maximum of five such mobile units.

In a further feature of the invention, mobile units whose key-identification code word agrees with a key-identification code word stored in the key-identification code word memory, are not subjected to further querying from the transponder. To that extent, the process between actuation of the key switch and removal of the diagnostic device can be carried out only for a new mobile unit. Furthermore, the code word memory of the stationary part need not be erased.

For control purposes, the system can be programmed so that after a resetting of the central lock system for a predetermined period of, for example, 72 hours, a display of the stationary unit can briefly indicate "substitute key programming" with each new operation of the motor vehicle.

According to a feature of the invention, the instantaneous remote active changing code word is stored in the transponder code word memory as a new transponder changing code word by providing an interface, preferably a serial interface from the transmitter to the transponder. The serial interface is provided within the mobile unit and connects the transmitter with the transponder. In another embodiment, the instantaneous remote actuation changing code word is stored in the transponder code word memory as the new transponder changing code word by being transmitted from the transponder-querying transceiver to the transponder.

In this case the transponder-querying transceiver which is provided with the actuated key switch, sends out its signal upon such actuation.

In a third embodiment, the instantaneous remote-control changing code word is stored in the transponder code word memory as the new transponder changing code word in that the key, after removal from a key switch accessible from the exterior of the vehicle is inserted into a key switch in the vehicle interior and actuates the latter to command the transmission of the instantaneous remote-control changing code word from the transponder-querying transceiver of the internal key switch to the transponder.

In this embodiment, the transceiver operated by the externally-accessible key switch is not equipped to supply signals equivalent to those which are produced by the transceiver operated by the internally-accessible key switch.

In this embodiment the total process which is the subject of this application can be carried out utilizing the internally-accessible key switch only, but, since usually the receiver is located at the door exterior or at the externally-accessible key switch, the mechanic may initially have to enter the vehicle to read out via the internally-accessible key switch, the key-identification code word. He then may have to leave the vehicle to actuate the transmitter and then again enter the vehicle to store the new transponder changing code word in the transponder code word memory.

To the extent that the key and the key switch need not have mechanical elements to be actuated, each mobile part can be utilized for a number of central locking systems of different vehicles. The invention, of course, permits setting in this case as well since the code word is transferred from the mobile part to the stationary part. A mobile unit which can operate a plurality of central locking units is practical for company-owned vehicles which may be a pool for operation by any of a number of users.

The internal key switch can have a number of positions and, according to the invention, the storage of the instantaneous remote-control changing code word as the new transponder changing code word can be effected in various switch positions in the internally-accessible switch, for example, "ACCESSORIES ON" or "SIGNAL ON" or "ENGINE START" positions.

It has been found to be advantageous to provide an optical and/or acoustic indication for the actuation of the transmitter. This indication can signal locking or unlocking actuation of the transmitter for the normal mode. This can correspond to the descent or rise of the internal locking knobs. When the transmitter and receiver operate with infrared communication, the transmitter and receiver must be within line of sight. It is possible to so arrange the system that it is necessary prior to electrical actuation of the transmitter to require removal of the key from the key switch.

BRIEF DESCRIPTION OF THE DRAWING

The above and other objects, features, and advantages will become more readily apparent from the following description, reference being made to the sole FIGURE of the accompanying drawing which is a block diagram of a lock system according to the invention.

SPECIFIC DESCRIPTION

In the drawing we have shown an automobile 10 provided with an engine 11 and otherwise illustrated highly diagrammatically.

The locking system can correspond to any of the locking systems described in the aforementioned patents and patent application as long as it permits the mode of operation of the present invention, and can include a stationary unit 12 in the vehicle itself and a mobile unit 13 in the form of a portable key equipped with a transmitter 14, a transponder 15 having a memory 16 and an interface 17 which can connect the transmitter 14 with the transponder 15. The transponder can have an antenna or the like coupling with an antenna represented diagrammatically at 18 adjacent the key switch 19 of the stationary unit.

The stationary unit itself can comprise, in addition to the externally-accessible key switch 19 which cooperates with the key 20, a number of door locks 21, 22, 23 and 24 of the vehicle doors, interconnected by a bus system 25 with a control unit which can have a microprocessor 27, memories 28 and a connecting system represented by the plug and jack structure 29 for removably affixing a diagnostic device 30 to the control unit.

A receiver 31 responsive to the signals from the transmitter 14 of the remote control unit 13, can be connected to the control unit 26 and the latter also has a transponder 32 cooperating with the antenna 18. Other locks may be provided to be controlled by the unit 26 and the latter may have an input from an internally-accessible key switch 33 which can also form the ignition switch of the engine 11.

From the drawing it will be apparent, therefore, that the mobile part or portable part separate from the motor vehicle comprises the transmitter 14, the transponder 15 and the key 20 while the fixed or stationary part 12 on the motor vehicle comprises the receiver 31, the transponder-querying transceiver 32 and the key-operated switch 19 or 33 operable by the key. In normal operation, actuation of the button 35 on the portable unit 13 can lock or unlock the vehicle doors by a signal sent by the transmitter 14 to the receiver 31. A light or acoustic signal can indicate the normal operation modes.

When, however, the portable unit 13 is lost or stolen, resetting is desirable.

For that purpose, the diagnostic device 30 need temporarily be connected to the control unit 26 and the control unit is switched into a "SETUP" mode.

When the fixed part of the system is in the "SETUP" mode, the key 20 is inserted into the key-operated switch 19 (or 33) thereby interrogating the transponder with the transceiver and deriving a key-identification code word stored in the memory connected to the transponder and storing the key-identification code word in the memory of the transceiver.

The transmitter is then operated to send a remote-control changing code word which progressively changes in the transmitter, to the receiver and the receiver picks up the then-effective remote control changing code word and stores that code word in the transceiver code word memory which may be one of the memories 28 and in the memory 16 of the transponder as a new transponder changing code word. The control unit 26 is then switched over to its "NORMAL" mode of operation and the diagnostic device can be removed.

When a plurality of portable units 13 are to be reset, each of the portable units with its different key-identification code word, has its key inserted into the switch 19 in turn before the diagnostic device is removed and the interrogation and code word storage steps are repeated.

We claim:

1. A method of resetting a central lock system of a motor vehicle having a remote-control arrangement of locking and unlocking the central lock system and wherein the remote-control arrangement comprises a mobile part separate from the motor vehicle and a fixed part on the motor vehicle, said mobile part comprising a transmitter, a transponder and a key, said fixed part comprising a receiver, a transponder-querying transceiver and a key-operated switch operable by said key, said method comprising the steps of:

(a) temporarily connecting a diagnostic device to said fixed part for initializing same and switching said fixed part into a SETUP mode in which a previously stored code word of said fixed part and a remote control changing code word of said mobile part are extinguished;

(b) with said fixed part of said SETUP mode, inserting said key into the key-operated switch thereby interrogating said transponder with said transceiver, deriving a key-identification code word stored in said transponder and storing said key-identification code word in a memory of said transceiver;

(c) then operating said transmitter to send a remote-control changing code word advancing in said transmitter to said receiver and picking up the then-effective remote control changing code word with said receiver and storing the picked-up then-effective remote-control changing code word in a transceiver code word memory of said transceiver and a transponder code word storage of the transponder as a new transponder changing code word; and (d) then switching said fixed part to a NORMAL mode of operation and removing said diagnostic device.

2. The method defined in claim 1 wherein said central lock system has a plurality of said mobile parts with different key-identification code words, steps (a) through (c) being carried out with said fixed part in said SETUP mode for each of said mobile parts.

3. The method defined in claim 2 wherein the maximum number of said mobile parts for said central lock system is five.

4. The method defined in claim 2 wherein, for mobile parts having key-identification code words corresponding to key-identification code words stored in memory in said fixed part, there is no further query to the fixed part by the transceiver.

5. The method defined in claim 1 wherein, after a resetting of the central lock system, for a predetermined period a display of said fixed part displays an indication of "substitute key" programming thereof after each operation of the motor vehicle.

6. The method defined in claim 5 wherein said predetermined period is 72 hours.

7. The method defined in claim 1 wherein the then-effective remote-control changing code word stored in said transponder code word memory is that which has been sent to the transponder by said transceiver.

8. The method defined in claim 1 wherein, for storing the then-effective remote-control changing code word in said transponder code word memory of said transponder as said new transponder changing code word, the key is removed from a key-operating switch of the fixed part accessible from an exterior of the vehicle and is inserted into a key-operated switch of the fixed part only accessible from within the vehicle and which, upon actuation by the key, sends the new transponder changing code word from the transceiver to the transponder.

* * * * *